United States Patent

Hayens

[11] Patent Number: 5,400,594
[45] Date of Patent: Mar. 28, 1995

[54] SLIPPER GUIDE FOR A HYDROSTATIC TRANSMISSION

[75] Inventor: Dale I. Hayens, Addison, Mich.

[73] Assignee: Tecumseh Products Company, Tecumseh, Mich.

[21] Appl. No.: 940,547

[22] Filed: Sep. 4, 1992

[51] Int. Cl.6 .................... F16D 31/02; F01B 1/06
[52] U.S. Cl. ........................ 60/487; 92/12.1; 92/58; 92/72; 91/492; 417/273
[58] Field of Search .................. 92/12.1, 58, 72; 91/491, 492, 494, 495; 60/487, 489; 417/273

[56] References Cited

U.S. PATENT DOCUMENTS

| | | | |
|---|---|---|---|
| 2,220,636 | 11/1940 | Bischof | 60/487 |
| 2,309,551 | 1/1943 | Trapp et al. | 103/174 |
| 3,805,675 | 4/1974 | Eickmann | 91/492 |
| 4,033,239 | 7/1977 | Gsching | 92/58 |
| 4,041,844 | 8/1977 | Steiger | 92/58 |
| 4,131,056 | 12/1978 | Rockwell | 91/492 |
| 4,223,595 | 9/1980 | Ortelli | 92/72 |
| 4,244,279 | 1/1981 | Stewart et al. | 60/487 X |
| 4,635,534 | 1/1985 | Eickmann | 91/488 |
| 4,683,806 | 8/1987 | Ryzner | 92/72 X |
| 4,719,843 | 1/1988 | Noel | 92/58 |
| 4,776,258 | 10/1988 | Eickmann | 92/58 |
| 4,914,914 | 4/1990 | Inoue | 60/489 |
| 4,967,556 | 11/1990 | Inoue | 60/489 |
| 4,982,566 | 1/1991 | von Kaler | 60/487 |
| 5,042,252 | 8/1991 | Havens | 60/487 |

Primary Examiner—Edward K. Look
Assistant Examiner—Hoang Nguyen
Attorney, Agent, or Firm—Baker & Daniels

[57] ABSTRACT

A slipper guide for use in radial piston type hydraulic pumps and motors, especially those utilized in hydrostatic transmissions. The slipper guide provides an annular path for the slippers, guiding and maintaining the slippers engaged with the inner circumferential surface of the track ring as the slippers are rotated within the track ring by the cylinder. The slipper guide consists of two plates axially attached to the track ring and fixed relative thereto. Each plate includes an annular, axially inwardly extending projection forming an annular surface upon which an under surface of an outer portion of the slippers rests. The annular projection positions and maintains the top surface of the slippers against the inner circumferential surface of the track ring.

17 Claims, 4 Drawing Sheets

SLIPPER GUIDE FOR A HYDROSTATIC TRANSMISSION

BACKGROUND OF THE INVENTION

The present invention relates to variable displacement hydrostatic transmissions and, more specifically to hydrostatic transmissions utilizing pumps and motors of the radial piston type.

A hydrostatic transmission transmits energy from rotary mechanical motion to fluid (typically oil) motion, and then back to rotary mechanical motion. Such transmissions are utilized in lawn and garden tractors, riding lawn mowers, and other small vehicles. Within a typical radial piston type hydrostatic transmission, incoming rotary mechanical motion rotates a cylinder disposed about a pintle. Pistons, positioned within the cylinders, are attached to slippers mounted in an expander band, so that as the cylinder unit rotates, the pistons are driven by the slippers which engage the surrounding eccentric annular track ring. U.S. Pat. No. 4,982,566 issued Jan. 8, 1991 to von Kaler et al. entitled "Expander Band for Hydrostatic Transmission," describes an expander band for a hydrostatic transmission in order to maintain the slippers against the track ring.

The pistons of the driving cylinder, or pump, create a pressurized fluid flow within the pintle which drives a receiving set of pistons likewise retained in a cylinder unit about the pintle. The receiving cylinder unit, or motor, drives an output shaft which, through gearing, drives the axles of the vehicle. The transmission ratio is thus directly proportional to the eccentricity of the track ring relative to the pintle. In the case of the pump, the eccentricity of the track ring relative the pintle is changeable such that a continuously variable ratio is achievable through reverse, neutral, and forward positions.

Prior art expander bands thus rotate with the cylinder block and pistons within the track ring. The rotation of the expander band creates additional turbulence in the fluid medium thus reducing the efficiency of the transmission. The rotating expander band also creates resistance to the rotation of the unit, thereby further reducing the efficiency of the transmission.

Conventional designs of expander bands include a plurality of slots circumferentially disposed at approximately equal distances. The slots allow the slippers to migrate from one end of the slot to the other as the cylinder unit rotates, preventing the pump or motor from binding up. However, the slippers tend to impact against and abrade the ends of the slots, which causes wear on the ends of the slots and slippers. This wear can affect the performance of the unit requiring repair or replacement. In addition, this wear can cause the ends of the slippers to chip away, causing metal particles to be introduced into the fluid. Such particles limit the efficiency and reduce the life of the transmission.

Further, prior art expander bands are generally split. As such, one end of the expander band can slide over the other end during operational rotation. This situation can cause inadequate fluid displacement of the pump and motor. It also can lead to binding of the hydraulic unit causing seizure thereof. Inadequate fluid displacement reduces the efficiency of the transmission, while seizure can require extensive repair of the unit.

What is therefore needed in the art is a way to mount the slippers of the pistons such that wear and abrasion are minimized. Also, the slippers must be positioned within the track ring such that no binding occurs. Further, the slipper mounting must be simple and economical.

SUMMARY OF THE INVENTION

The present invention provides a slipper guide for maintaining the slippers of a radial piston type hydraulic unit engaged with the inner circumferential surface of a surrounding track ring. The slippers rotate independently of the slipper guide which is mounted to the track ring.

In one form thereof, the present invention provides a hydraulic pump or motor comprising a rotatable cylinder unit having a plurality of radially extending cylinders. A plurality of pistons are each disposed in a corresponding cylinder of the cylinder unit for reciprocating motion therein. A plurality of slippers are each attached to a corresponding piston. A track ring radially surrounds the cylinder unit, the track ring having an inner circumferential surface engaged by the plurality of slippers. A guide is provided which maintains the plurality of slippers engaged against the inner circumferential surface of the track ring, the slippers being rotatably independent of the guide.

Further, the guide and the inner circumferential surface of the track ring define therebetween an annular channel, with a portion of each of the plurality of slippers being disposed within the annular channel.

In another form thereof, the present invention provides a hydrostatic transmission comprising a housing, with a conduit disposed in the housing. A pump is radially disposed on the conduit and in fluid communication therewith. The pump includes a first rotatable cylinder unit having a first plurality of radially extending cylinders therein, a first plurality of radially extending pistons each disposed in a corresponding first cylinder, and a first plurality of slippers each radially mounted on an end of a corresponding first piston. A first track ring is radially disposed about the pump, the first track ring defining a first inner circumferential surface engageable by the first slippers. A motor is radially disposed on the conduit and in fluid communication therewith so as to be in fluid communication with the pump. The motor includes a second rotatable cylinder unit having a second plurality of radially extending cylinders therein, a second plurality of radially extending pistons each disposed in a corresponding second cylinder, and a second plurality of slippers each radially mounted on an end of a corresponding second piston. A second track ring is radially disposed about the motor, the second track ring defining a second inner circumferential surface engageable by the second slippers. First guide means for maintaining the first plurality of slippers engaged against the first inner circumferential surface of the first track ring is provided, the first plurality of slippers being rotatably independent of the first guide means. Second guide means for maintaining the second plurality of slippers engaged against the second inner circumferential surface of the second track ring is provided, the second plurality of slippers being rotatably independent of the second guide means.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
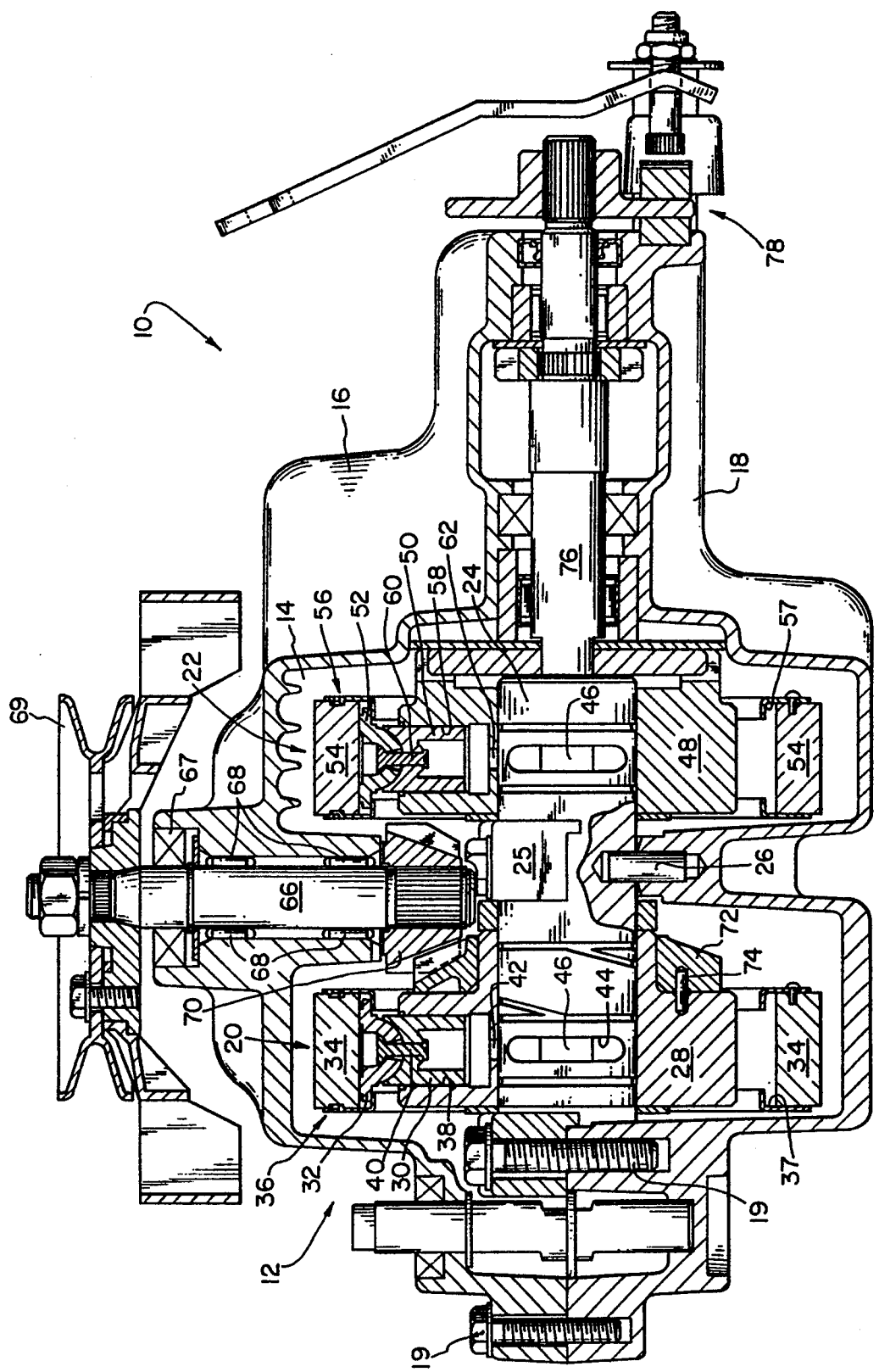
FIG. 1 is a cross-sectional view of a hydrostatic transmission utilizing the slipper guide of the present invention.

Referring now to FIG. 1, there is shown a hydrostatic transaxle 10 of the type having a variable displacement, radial piston type hydrostatic transmission unit 12 disposed in a chamber or cavity 14 formed by upper and lower housing parts 16 and 18. Upper and lower housing parts 16, 18 are attached by a plurality of housing bolts 19. Transmission unit 12 includes a hydraulic pump 20 and hydraulic motor 22 each disposed on a pintle 24. A pintle support member 25 separates pump 20 and motor 22, while pintle 24 extends therethrough. A pintle pin 26 fixes pintle 24 in cavity 14.

Figure 5:
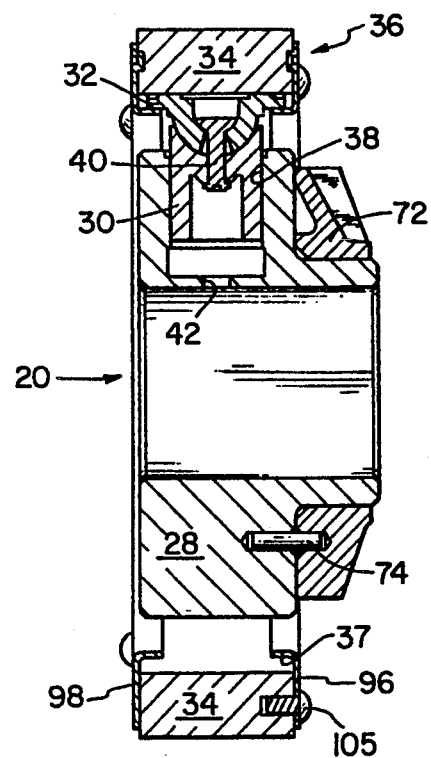
FIG. 5 is a sectional view taken along line 5—5 of FIG. 4.

With additional reference to FIG. 5, pump 20 comprises a cylinder unit 28, a plurality of pistons 30, a plurality of slippers of which only one slipper 32 is shown, a track ring 34, and slipper guide 36 according to the present invention. Cylinder unit 28 is rotatably disposed about pintle 24 which provides an axis of rotation. Cylinder unit 28 includes a plurality of cylinder bores of which only one cylinder bore 38 is shown, in which pistons 30 are reciprocatingly disposed. Cylinder bores 38 are in a fixed radial position relative to pintle 24. Pistons 30 are thus positioned within respective cylinders 38, while connecting rivets 40 attach corresponding slippers 32 to the end of pistons 30. Track ring 34, positioned eccentrically about pintle 24, radially surrounds pistons 30 and slippers 32. Track ring 34 is pivotable about pintle 24 to activate pistons 30, and to change the fluid displacement of pistons 30 in order to vary the output speed and direction of rotation. Slipper guide 36, which is described in greater detail hereinbelow, defines an annular channel 37 which guides slippers 32 as they circle thereabout along with cylinder unit 28. Slipper guide 36 also maintains slippers 32 engaged against track ring 34 as hereinbelow described.

Pump cylinder unit 28 has a plurality of ports bored therein of which only one port 42 is shown. The number of ports 42 correspond to the number of cylinder bores 38 in cylinder unit 28. Each port 42 is radially inwardly disposed in each respective cylinder bore 38, and thus in communication therewith. Pintle 24 includes two pump pintle ports, of which only one pump pintle port is shown 44, which respectively communicate with two pintle conduits, of which only one pintle conduit 46 is shown. As cylinder unit 28 rotates about pintle 24, ports 42 become aligned with pintle ports 44 such that cylinder bores 38 selectively communicate with pintle conduits 46.

Figure 3:
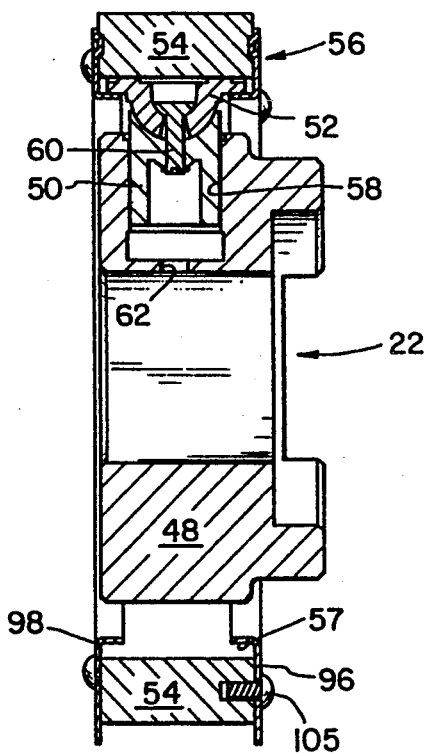
FIG. 3 is a sectional view taken along line 3—3 of FIG. 2.

With additional reference to FIG. 3, motor unit 22 comprises a cylinder unit 48, a plurality of pistons 50, a plurality of slippers of which only one slipper 52 is shown, a track ring 54, and slipper guide 56. Cylinder unit 48 is rotatably disposed about pintle 24 which provides an axis of rotation. Cylinder unit 48 includes a plurality of cylinder bores of which only one cylinder bore 58 is shown. Respective pistons 50 are reciprocatingly disposed in cylinder bores 58. Cylinder bores 58 are in a fixed radial position relative to pintle 24. Pistons 50 are thus positioned within respective cylinders bores 58, while connecting rivets 60 attach corresponding slippers 52 to the end of pistons 50. Track ring 54, positioned eccentrically about pintle 24, radially surrounds pistons 50 and slippers 52. Track ring 54 is fixed relative pintle 24 such that the pressurized fluid output from pump 20 determines the speed and direction of motor 22. Slipper guide 56, which is described in greater detail hereinbelow, defines an annular channel 57 which guides slippers 52 as they circle thereabout along with cylinder unit 48. Slipper guide 56 also maintains slippers 52 engaged against track ring 54 as hereinbelow described.

Motor cylinder unit 48 has a plurality of ports bored therein of which only one port 62 is shown. The number of ports 62 correspond to the number of cylinder bores 58 in cylinder unit 48. Each port 62 is radially inwardly disposed in each respective cylinder bore 58, and thus in communication therewith. Pintle 24 includes two motor pintle ports, of which only one motor pintle port is shown 64, which respectively communicate with two pintle conduits, of which only one pintle conduit 46 is shown. Pump 20 is thus in fluid communication with motor 22 via pintle 24. Pressurized fluid pumped into pintle 24 from pump 20 is received by motor 22 which causes cylinder unit 48 to rotate about pintle 24. During this time, motor ports 62 become aligned with pintle ports 64 such that cylinders 58 are in selective communication with pintle conduits 46.

Rotational motion or energy is imparted to pump 20 by an input shaft 66 which extends through upper housing 16. An oil seal 67 seals input shaft 66, while needle bearings 68 support input shaft 66. A pulley 69 is attached to one end of input shaft 66 external to upper housing 16 and is connected via a belt (not shown) to an engine (not shown). The other end of input shaft 66 includes a shaft bevel gear 70 which is in rotational meshing engagement with an input bevel gear 72. Input bevel gear 72 is attached to pump track ring 34 via a spirol pin 74. As input shaft 66 is rotated by pulley 69, shaft bevel gear 70 rotates input bevel gear 72 which consequently rotates pump cylinder unit 28. In this manner, rotation is imparted to pump 20, which pumps hydraulic fluid (e.g. oil) through pintle 24 to drive motor 22.

Connected to motor 22 is an output shaft 76, which through gearing (not shown) is connected to a differential (not shown) connected to the axles (not shown). A braking mechanism 78 is operatively disposed on output shaft 76 in order to slow down the rotation of output shaft 76. Thus, hydraulic fluid is circulated within hydraulic transmission 12 to transmit rotational motion from input shaft 66 by converting the rotational motion to fluid pressure by pump 20, and then by converting the fluid pressure to rotational motion by motor 22 for driving output shaft 76.

Figure 4:
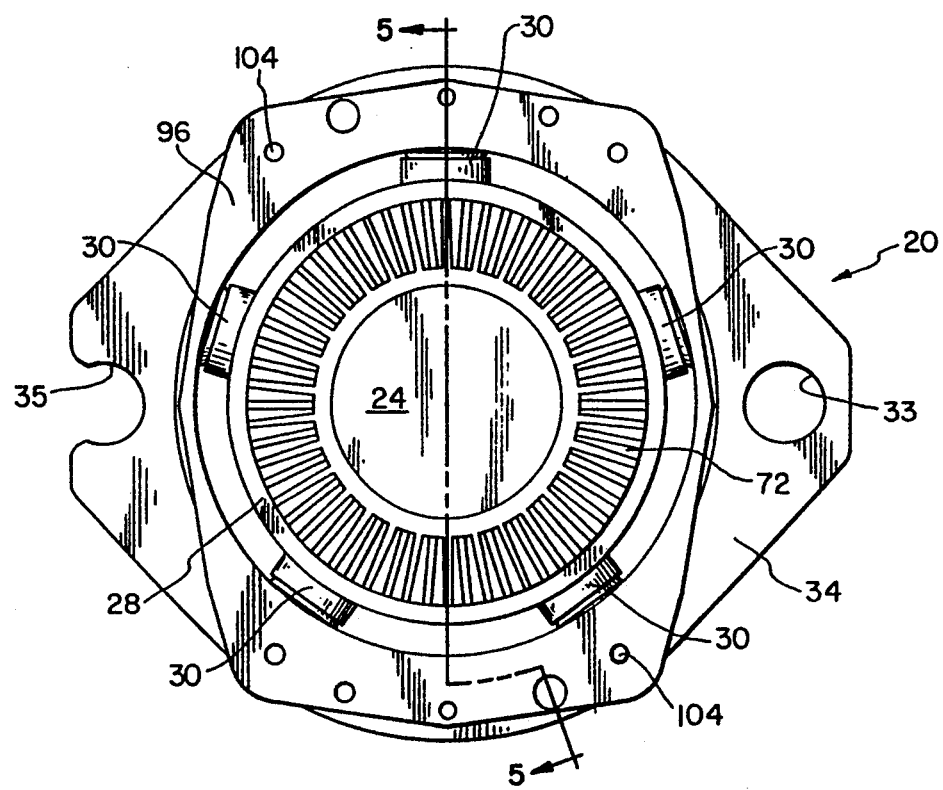
FIG. 4 is an enlarged side view of the variable displacement pump with the slipper guide of the present invention.

In order for pump 20 to pump pressurized fluid to translate the rotation of input shaft 66 to output shaft 76, circles defined by pintle 24 and pump track ring 34 must be eccentric relative to each other. A control mechanism (not shown) determines the transmission ratio through pivotal movement of pump track ring 34 about pintle 24, by varying the eccentricity of the circle defined by pump track ring 34 relative the circle defined by pintle 24. The direction of travel of pump track ring 34 about pintle 24 determines forward and reverse directions. A neutral position is defined when the eccentricities of the circles of the pump track ring 34 and pintle 24 is zero. Pump track ring 34 is confined to pivot within a range of movement bounded by a fully forward position and a fully reverse position. Referring to FIG. 4, a side view of pump 20 shows pump track ring 34 having a bore 33 which receives a pivot pin (not shown) about which pump track ring 34 pivots. In addition, a control mechanism (not shown) operatively joins pump track ring 34 at a notch 35 for control of the pivotal movement of the pump track ring. It should be understood that, unlike pump track ring 34, motor track ring 54 does not pivot about pintle 24, but is maintained in a fixed position relative to pintle 24. However, it should likewise be understood that pump track ring 34 may be fixed relative to pintle 24 while motor track ring 54 is pivotable.

With the exception of the pivotal movement of pump track ring 34, the operation of pump 20 and motor 22 are the same. Thus, although the operation of the hydraulic pump will be described in connection with the present invention, the manner and principles of operation of the hydraulic unit as well as the manner and principles of the present invention equally apply to the pump and the motor. As such, the present invention is utilizable in both hydraulic pumps and motors of the radial piston type.

Figure 6:
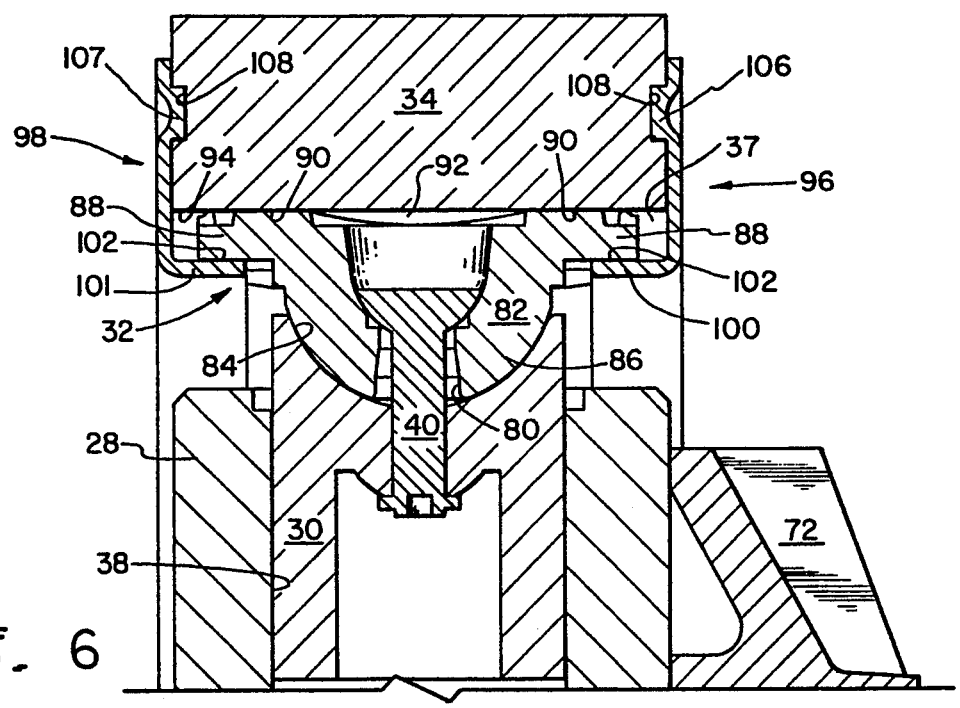
FIG. 6 is an enlarged fragmentary cross-sectional view of a pump slipper contacting the inner surface of the track ring enclosed by the slipper guide of the present invention.

Referring to FIG. 6, slippers 32 are connected to piston 30 by rivet 40, with one end of rivet 40 being positioned in a tapered receiving hole 80 of base 82 with the other end secured to piston 30. Receiving hole 80 allows relative movement between rivet 40 and base 82, although with respect to piston 30 rivet 40 is immovable. Spherical recess 84 of piston 30 receives the semispherical portion 86 of base 82 to allow limited pivotal movement of slipper 32 relative to piston 30. This freedom of radial movement is important since pistons 30 have virtually no freedom of movement within cylinder unit 26 except in the radial direction. Base 82 includes a flange portion 88 defining a ledge radially outwardly extending from and surrounding base 82. Portion 88 of slipper 32 includes an upper surface 90 essentially annular in a top plan view (not shown) which contacts an inner circumferential surface 94 of track ring 34. Upper surface 90 includes a center bore 92 therein which reduces the contact surface area between slipper 32 and inner circumferential surface 94 of track ring 34.

As pump cylinder unit 28 is rotated, pistons 30 within cylinders 38 are likewise rotated causing their corresponding slippers 32 to orbit pintle 24. During rotation, upper surface 90 of slippers 32 engage and rotatably follow inner circumferential surface 94, which defines the stroke position of pistons 30 within cylinders 38. It is essential that upper surface 90 of slippers 32 always be in contact with inner circumferential surface 94 of track ring 34. This assures that as slippers 32 rotate, attached pistons 30 properly reciprocate within their respective cylinders to maximize the efficiency of the hydraulic unit. Proper reciprocation and accurate tracking and guiding of pistons 30 about inner circumferential surface 94 by maintaining upper surface 90 of slippers 32 properly positioned, i.e. engaged against inner circumferential surface 94, creates a proper pressurized fluid flow within the pintle conduits.

In accordance with an aspect of the present invention, accurate tracking and guiding of the slippers without the problems of the prior art is accomplished by the use of slipper guide 36. Slipper guide 36 maintains the upper surface of the slippers engaged against the inner circumferential surface of the track ring by providing a guide for the slippers which is rotatably independent of the rotation of the cylinder unit and thus the slippers. The slippers rotate with the cylinder unit while the slipper guide is rotatably stationary relative thereto.

Figure 2:
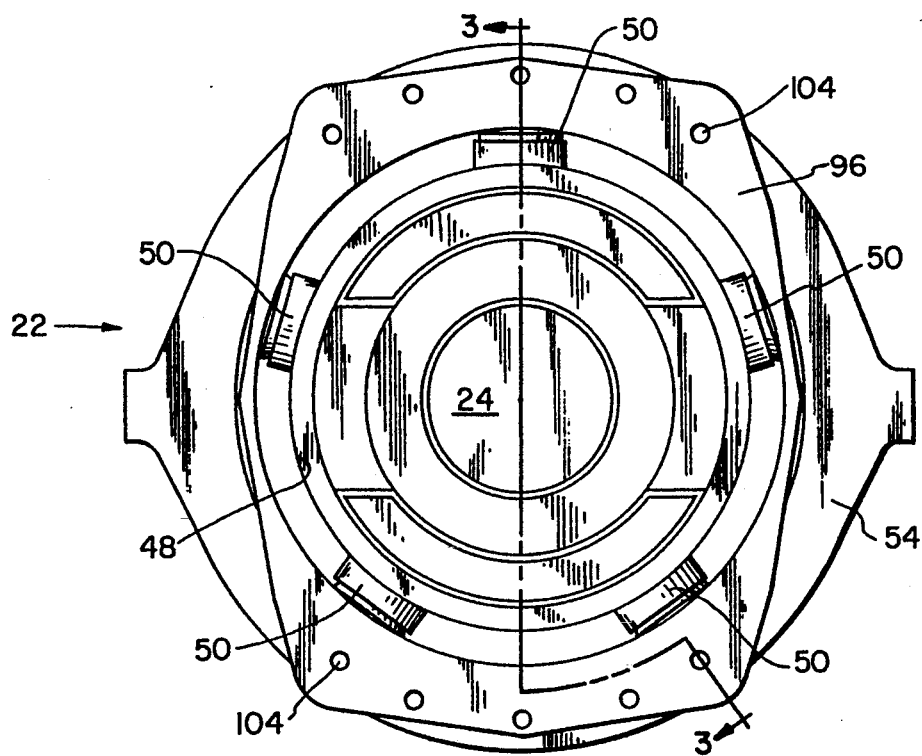
FIG. 2 is an enlarged side view of the fixed displacement hydraulic motor with the slipper guide of the present invention.
Figure 7:
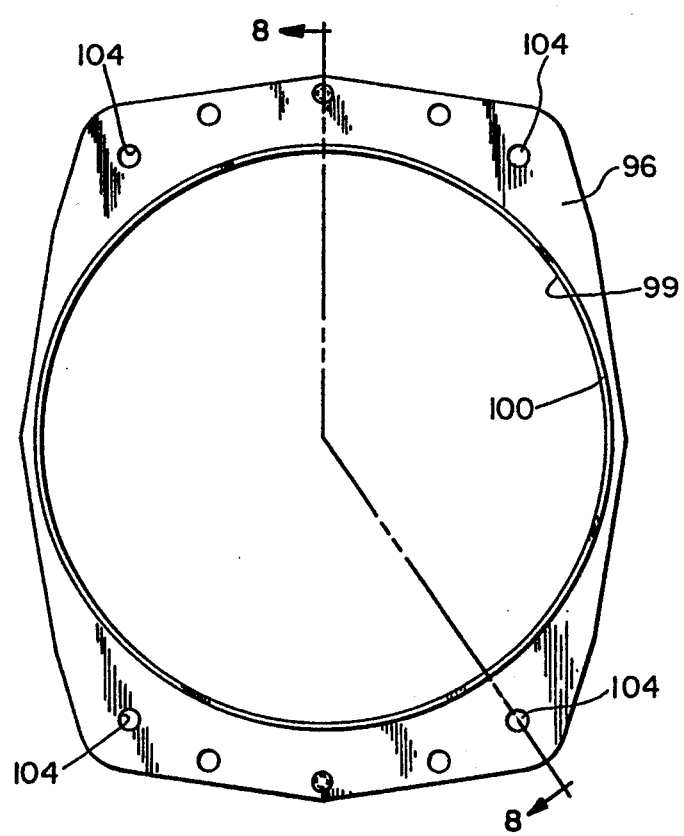
FIG. 7 is an elevational view of one plate of the present invention.
Figure 8:
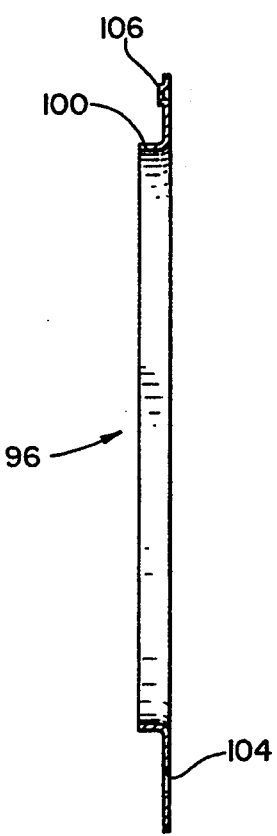
FIG. 8 is a sectional view of the one plate taken along line 8—8 of FIG. 7.

In a preferred embodiment, slipper guide 36 consists of two like plates 96 and 98 which axially attach to the track ring on respective outer sides thereof. Referring to FIGS. 7 and 8, there is shown slipper guide plate 96 having an opening 99, and fabricated as a stamping from sheet metal. An axially inwardly extending projection 100 forms an annular ring about the edge of opening 99. FIGS. 2 and 4 show plates 96 positioned and attached to motor track ring 54 and pump track ring 34, respectively. Plate 96 includes screw apertures 104 into which screws 105 extend in order to fasten the plate to the respective axial side of the respective track ring. A corresponding plate is likewise attached to the other side of the respective track ring.

As best seen in FIGS. 3 and 5, which show motor unit 22 and pump unit 20, respectively, plates 96 and 98 of slipper guides 36 and 56 axially engage the sides of motor track ring 54 and pump track ring 34, respectively. Projection 100 of each plate 96 and 98 axially inwardly extends towards each other, and with the inner circumferential surface of the respective track ring defines annular guide channels 57 and 37, respectively, within which respective slippers 52 and 32 rotate and thus are guided and retained.

Referring to FIG. 6, projections 100, 101 extend axially inwardly such that under surface 102 of base 88 rests thereon. The height of annular space 37, defined by and between projections 100, 101 and inner circumferential surface 94 of track ring 34, corresponds to the height of flange 88.

Bearing surface 102 of plates 96, 98, through contact with flange 88 of the slipper, maintains upper surface 90 of the slipper in contact against inner circumferential surface 90 of the track ring. Thus, during rotation of the cylinder unit, the slippers are positively maintained in contact against the track ring surface so that the unit will operate efficiently.

Further, each plate includes an axially inwardly projecting notch 108 which engages a corresponding notched recess 108 in the axial sides of track ring 34. This permits easy alignment of the plates onto the track ring, while assuring positive retention of the same such that plates 96, 98 of the slipper guide is fixed relative to the track ring. Thus, in the case of pump 20, pivoting of pump track ring 34 also pivots slipper guide 36 therewith. In the case of motor 22, slipper guide 56 is fixed relative to pintle 24 in like manner as motor track ring 54.

In operation, as the pump and motor cylinder units 28, 48 rotate within respective track rings 34, 54, respective slippers 32, 52 and pistons 30, 50 rotate therewith. Slipper guides 36, 56, being fixed to the respective track rings 34, 54 do not rotate with the cylinder unit. Thus, the slipper guides are rotatably independent of the cylinder unit. In the case of a pivotable track ring, the slipper guide pivots with the track ring while still not rotating with the cylinder unit.

Thus, the present invention has eliminated the need for rotating expander bands or retaining rings by providing a slipper guide, axially attached and fixed relative to the respective hydraulic unit track ring, such that the cylinder unit rotates while the slipper guide is rotatably stationary relative thereto.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic pump or motor, comprising:
   a rotatable cylinder unit having a plurality of radially extending cylinder bores, each said cylinder bore including an open piston receiving end disposed at the radially outward end thereof;
   a plurality of pistons respectively disposed in each of said cylinder bores for reciprocating movement therein;
   a plurality of slippers respectively attached to and disposed radially outward from each said piston, said slippers being separate from and movable relative to said cylinder unit;
   a track ring radially surrounding said cylinder unit, said track ring rotatable relative to and independent of said cylinder unit, said track ring having a surface engaged by said slippers; and
   guide means for maintaining said slippers engaged against said surface of said track ring, said guide means being rotatably independent of said rotatable cylinder unit.

2. The hydraulic pump or motor of claim 1, wherein said guide means is fixed to said track ring.

3. The hydraulic pump or motor of claim 1, wherein said guide means is axially fixed to said track ring.

4. The hydraulic pump or motor of claim 1, wherein an annular channel is defined by and between said guide means and said surface of said track ring, and where said slippers are disposed within said annular channel.

5. The hydraulic pump or motor of claim 1, wherein said guide means comprises:
   a first plate disposed on an axial side of said track ring, said first plate having a first axially inwardly extending annular projection defining a first annular ledge; and
   a second plate disposed on another axial side of said track ring opposite said first plate, said second plate having a second axially inwardly extending annular projection defining a second annular ledge;
   said first and second annular ledges supporting said slippers against radially inward movement while maintaining said plurality of slippers engaged against said surface of said track ring.

6. The hydraulic pump or motor of claim 5, wherein said first and second plates are fixed to said track ring.

7. The hydraulic pump or motor of claim 5, wherein said first plate is disposed on an axially outer side of said track ring, and said second plate is disposed on an opposite another axially outer side of said track ring relative to said first plate.

8. The hydrostatic pump or motor of claim 1, wherein said slippers include a flange, said guide means defining a bearing surface for contact with said flange for positionally maintaining said slippers within said track ring.

9. A hydrostatic transmission, comprising:
   a housing;
   a conduit disposed in said housing;
   a pump radially disposed on said conduit and in fluid communication therewith, said pump including a first rotatable cylinder unit having a first plurality of radially extending cylinder bores therein, each of said first plurality of cylinder bores including an open piston receiving end disposed at the outward end thereof, a first plurality of pistons respectively disposed in each of said first plurality of cylinder bores, and a first plurality of slippers respectively attached to and disposed radially outward from each of said first plurality of pistons, said first plurality of slippers being separate from and movable relative to said first cylinder unit;
   a first track ring radially disposed about said pump, said track ring rotatable relative to and independent of said first cylinder unit, said first track ring defining a first surface engageable by said first slippers;
   a motor radially disposed on said conduit and in fluid communication therewith so as to be in fluid communication with said pump, said motor including a second rotatable cylinder unit having a second plurality of radially extending cylinder bores therein, each of said second plurality of cylinder bores including an open piston receiving end disposed at the radially outward end thereof, a second plurality of pistons respectively disposed in each said second plurality of cylinder bores, and a second plurality of slippers respectively attached to and disposed radially outward from each of said second plurality of pistons, said second plurality of slippers being separate from and movable relative to said second cylinder unit;
   a second track ring radially disposed about said motor, said track ring rotatable relative to and independent of said second cylinder unit, said second track ring defining a second surface engageable by said second slippers;
   first guide means for maintaining said first slippers engaged against said first surface of said first track ring, said first guide means being rotatably independent of said first rotatable cylinder unit; and
   second guide means for maintaining said second slippers engaged against said second surface of said second track ring, said second guide means being stationary relative to said second rotatable cylinder unit.

10. The hydrostatic transmission of claim 9, wherein said first and second guide means are fixed to said first and second track rings, respectively.

11. The hydrostatic transmission of claim 9, wherein said first and second guide means are axially fixed to said first and second track rings, respectively.

12. The hydrostatic transmission of claim 9, wherein a first and second annular channel is respectively defined by and between said first and second guide means and said first and second surfaces, said first and second slippers disposed within said first and second annular channels, respectively.

13. The hydrostatic transmission of claim 9, wherein said first and second guide means each comprises:
   a first plate disposed on an axial side of said first track ring, said first plate having a first axially inwardly extending annular projection defining a first annular ledge; and
   a second plate disposed on another axial side of said second track ring opposite said first plate, said second plate having a second axially inwardly extending annular projection defining a second annular ledge;
   said first and second annular ledges supporting said respective slippers against radially inward movement while maintaining said respective slippers engaged against said respective surface of said respective track ring.

14. The hydraulic pump or motor of claim 13, wherein said first and second plates of each of said first and second guide means are attached to said first and second track rings, respectively.

15. The hydraulic pump or motor of claim 9, wherein said first and second guide means are axially attached to said first and second track rings, respectively.

16. The hydrostatic transmission of claim 9, wherein said first and second slippers each includes radially extending flanges, said first and second guide means defines first and second bearing surfaces, respectively, for contact with said respective flanges for positionally maintaining said first and second slippers within said first and second track rings respectively.

17. A hydraulic pump or motor, comprising:
   a rotatable cylinder unit having a plurality of radially extending cylinder bores, each said cylinder bore including an open piston receiving end disposed at the radially outward end thereof;
   a plurality of pistons respectively disposed in each of said cylinder bores for reciprocating movement therein;
   a plurality of slippers respectively attached to and disposed radially outward from each said piston, said slippers being separate from and movable relative to said cylinder unit;
   a track ring radially surrounding said cylinder unit, said track ring rotatable relative to and independent of said cylinder unit, said track ring having a surface engaged by said slippers; and
   a pair of guides disposed respectively on opposite axial sides of said track ring maintaining said slippers engaged against said surface of said track ring during rotation of said rotatable cylinder unit, said guides each defining a bearing surface for contact by said slippers for positionally maintaining said slippers within said track ring, said guide being rotatably independent of said rotatable cylinder unit.

* * * * *

UNITED STATES PATENT AND TRADEMARK OFFICE
CERTIFICATE OF CORRECTION

PATENT NO. : 5,400,594
DATED : March 28, 1995
INVENTOR(S) : Dale I. Havens

It is certified that error appears in the above-indentified patent and that said Letters Patent is hereby corrected as shown below:

Inventors:
On the title page, section [19], delete "Hayens" and substitute --Havens-- therefor.

On the title page, section [75], delete "Hayens" and substitute --Havens-- therefor.

Signed and Sealed this

Twentieth Day of June, 1995

Attest:

BRUCE LEHMAN

Attesting Officer    Commissioner of Patents and Trademarks